United States Patent
Huber et al.

(10) Patent No.: US 11,709,354 B2
(45) Date of Patent: Jul. 25, 2023

(54) MICROMECHANICAL MIRROR DEVICE, MIRROR SYSTEM, AND METHOD FOR PRODUCING A MICROMECHANICAL MIRROR DEVICE

(71) Applicant: Robert Bosch GmbH, Stuttgart (DE)

(72) Inventors: Christian Huber, Ludwigsburg (DE);
Marc Schmid, Stuttgart (DE);
Reinhold Roedel, Reutlingen (DE);
Christoph Schelling, Stuttgart (DE);
Christoph Daniel Kraemmer, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 486 days.

(21) Appl. No.: 16/966,425

(22) PCT Filed: Jan. 24, 2019

(86) PCT No.: PCT/EP2019/051690
§ 371 (c)(1),
(2) Date: Jul. 30, 2020

(87) PCT Pub. No.: WO2019/149605
PCT Pub. Date: Aug. 8, 2019

(65) Prior Publication Data
US 2021/0033847 A1 Feb. 4, 2021

(30) Foreign Application Priority Data

Feb. 1, 2018 (DE) .................... 10 2018 201 512.0
Feb. 8, 2018 (DE) .................... 10 2018 201 965.7

(51) Int. Cl.
*G02B 26/08* (2006.01)
*G02B 26/00* (2006.01)

(52) U.S. Cl.
CPC ....... *G02B 26/0833* (2013.01); *G02B 26/001* (2013.01)

(58) Field of Classification Search
CPC .................... G02B 26/0833; G02B 26/001
See application file for complete search history.

(56) References Cited

U.S. PATENT DOCUMENTS 5,825,528 A 10/1998 Goossen
2004/0136076 A1 7/2004 Tayebati
(Continued)

FOREIGN PATENT DOCUMENTS

CN 1748168 A 3/2006
CN 103460113 A 12/2013
(Continued)

OTHER PUBLICATIONS

International Search Report corresponding to PCT Application No. PCT/EP2019/051690, dated Apr. 23, 2019 (German and English language document) (5 pages).

*Primary Examiner* — Euncha P Cherry
(74) *Attorney, Agent, or Firm* — Maginot, Moore & Beck LLP (57) ABSTRACT

A micromechanical mirror device, a mirror system, and a method for producing a micromechanical mirror device are disclosed. The mirror device comprises a first mirror element, which is flat, and a second mirror element, which is flat. The first and second mirror elements are arranged substantially plane-parallel. An intermediate space between the first and second mirror elements has a lower index of refraction than one or both of the first mirror element and second mirror element. The first and second mirror elements are locally spaced apart from each other by at least one support structure. The support structure overlaps with the first and second mirror elements in an axial direction, which is perpendicular to the first and second mirror elements. The (Continued)

support structure includes a material that is different from a material from which one or both of the first and second mirror elements are formed.

14 Claims, 6 Drawing Sheets

(56) References Cited

U.S. PATENT DOCUMENTS

| | | |
|---|---|---|
| 2006/0077507 A1 | 4/2006 | Chui et al. |
| 2008/0094469 A1 | 4/2008 | Yan |
| 2008/0094690 A1 | 4/2008 | Luo et al. |
| 2008/0278787 A1 | 11/2008 | Sasagawa |
| 2010/0245979 A1 | 9/2010 | Londergan et al. |
| 2012/0281270 A1* | 11/2012 | Hong .................. G09G 3/3433 |
| | | 359/290 |
| 2014/0111811 A1 | 4/2014 | Tuohiniemi |

FOREIGN PATENT DOCUMENTS

| | | |
|---|---|---|
| CN | 103502874 A | 1/2014 |
| DE | 10 2010 031 581 A1 | 1/2011 |
| JP | 2015-158670 A | 9/2015 |

* cited by examiner

MICROMECHANICAL MIRROR DEVICE, MIRROR SYSTEM, AND METHOD FOR PRODUCING A MICROMECHANICAL MIRROR DEVICE

This application is a 35 U.S.C. § 371 National Stage Application of PCT/EP2019/051690, filed on Jan. 24, 2019, which claims the benefit of priority to Serial No. DE 10 2018 201 512.0, filed on Feb. 1, 2018 in Germany and which claims the benefit of priority to Serial No. DE 10 2018 201 965.7, filed on Feb. 8, 2018 in Germany, the disclosures of which are incorporated herein by reference in their entirety.

BACKGROUND

The present disclosure relates to a micromechanical mirror device, to a mirror system and to a method for producing a micromechanical mirror device. An interferometer in accordance with the Fabry-Perot principle that uses the mirror device according to the disclosure and/or the mirror system according to the disclosure is furthermore provided.

Tunable spectral filters with the possibility of miniaturization can be realized by means of MEMS technology, for example as Fabry-Perot interferometers (FPI). This utilizes the fact that a cavity, consisting of two plane-parallel, highly reflective mirror devices having a distance (cavity length) in the region of optical wavelengths, exhibits strong transmission only for wavelengths at which the cavity length corresponds to an integer multiple of half the wavelength. The cavity length can be changed for example by means of electrostatic or piezoelectric actuation, as a result of which a spectrally tunable filter element is obtained. An important influencing factor on a performance of such a spectrometer is the parallelism of the two mirror devices, which should be as high as possible so that a defined cavity between the two mirror devices with as high a finesse as possible is obtained.

In order to implement a Fabry-Perot interferometer that can address as large a wavelength range as possible, several conditions must be met. One fundamental criterion is that the two mirror elements of the interferometer are highly reflective over the entire wavelength ranged to be measured. One design of mirror devices in miniaturized interferometers that is often used are dielectric layer systems made from alternating layers of materials having a high and low refractive index, in particular Bragg reflectors, or "distributed Bragg reflectors" (DBR), in which an optical thickness of said layers is ideally in each case a quarter of the central wavelength of the range that is to be addressed.

Maximum reflectivity of the mirror layers is obtained by a refractive index jump of the DBR mirror layers that is as high as possible. Very high refractive index jumps can be obtained, for example, with silicon/air multilayer mirror stacks. To ensure that mirror layers within a mirror device exhibit mutual parallelism in this case, support structures that maintain the distance of the surrounding highly refractive layers, which are called mirror elements herein, are helpful.

US 2014/0111811 A1 discloses a tunable Fabry-Perot interferometer comprising anchor structures that keep two mirror devices, i.e. reflective elements, at a distance from one another. A stiffness of the mirror devices can be set via the density of the support elements. Both mirror devices are connected to one and the same substrate. Until now, parts of the highly refractive layer, that is to say of the mirror elements, or intermediate layers have been used as support structures.

SUMMARY

The present disclosure discloses a mirror device, a mirror system, and a method all having the features of the disclosure.

Accordingly, provision is made for a micromechanical mirror device, comprising: a first mirror element designed to be planar; a second mirror element designed to be planar; wherein the first and the second mirror element are substantially arranged in a plane-parallel manner; wherein an intermediate space between the first and the second mirror element has a lower refractive index than the first and/or the second mirror element; wherein the first and the second mirror element are locally arranged to be spaced apart from one another by at least one support structure; wherein the at least one support structure overlaps the first and the second mirror element in an axial direction, which is arranged perpendicular to the first and the second mirror element; and wherein the at least one support structure includes a material, or is formed from a material, that differs from a material from which the first and/or the second mirror element is formed.

A mirror device is in particular understood to mean a device that reflects a light beam in a Fabry-Perot interferometer.

Furthermore, a mirror system is provided that has at least one mirror device according to the disclosure and a contacting device designed to apply different electric potentials to at least two partial portions, which are electrically insulated from one another, of the first and/or the second mirror element of the at least one mirror device.

Furthermore, a method for producing a micromechanical mirror device is provided, comprising the steps of: providing a layer stack, having:

a dielectric layer;

a first light-refracting layer arranged at the dielectric layer;

a sacrificial layer arranged at the first light-refracting layer;

a second light-refracting layer arranged at the sacrificial layer;

removing in each case a part of the first light-refracting layer, of the second sacrificial layer and of the second light-refracting layer to produce a contiguous cutout in the layer stack such that the cutout overlaps the first and the second light-refracting layer in an axial direction arranged perpendicular to the first and the second light-refracting layer;

depositing a filling layer on a side of the layer stack to which the cutout opens;

wherein the filling layer consists of a material that differs from the material of the first and/or the second light-refracting layer;

removing a part of the filling layer that lies outside an original outer layer of the layer stack; and removing the dielectric layer and the sacrificial layer for providing, in particular exposing, the first and the second light-refracting layer as mirror elements that are plane-parallel with respect to one another.

The sacrificial layer can also be called dielectric layer and consist of silicon dioxide, for example.

With particular preference, a distance between the first and the second mirror element corresponds to a quarter of a central wavelength for which the mirror device is intended to serve as an optical filter.

The at least one support structure can consist of one or more separate support elements or have one or more separate support elements. Owing to the fact that the at least one support structure overlaps both the first and the second mirror element in the axial direction, a mechanically particularly good connection is realized, wherein the at least one support structure at the same time reduces any deformation of the mirror elements under stress.

Preferably, the first and the second mirror element are formed from the same material, while the at least one support structure is formed only from materials or from exactly one material that differ or differs from the material from which the mirror elements are formed.

The use of different materials for the at least one support structure and for the mirror elements enables separate optimization of the electrical and mechanical properties of the support structure and of the optical properties of the mirror elements. It is particularly preferred if the at least one support structure is formed from one or more electrically insulating materials, while the first and/or the second mirror element is or are formed from an electrically conductive or semiconductive material so that the partial portions of the mirror elements can operate as separate electrodes. Moreover, the material of the support structure can have a different thickness and/or a different mechanical stress than the material of the mirror elements, as a result of which it is possible to increase the robustness of the entire mirror device.

Advantageous embodiments and developments are evident from the dependent claims and from the description with reference to the figures.

According to a preferred development, the material of the support structure has a different thickness and/or mechanical stress than a material of the first mirror element and/or of the second mirror element. In this way, for example the stiffness and thus the robustness of the entire mirror device can be positively influenced.

According to an advantageous development, the at least one support structure divides the first mirror element and the second mirror element into at least two partial portions each, which are electrically insulated from one another by the at least one support structure.

Owing to the electrical separation of the at least two partial portions of the first and of the second mirror element, a multiplicity of application and design possibilities for the micromechanical mirror device are opened up. For example, the different partial portions that are electrically insulated from one another can be used as separate electrodes to which different electric potentials can be applied and/or different currents and voltages can be applied.

For example, it is possible to apply a voltage that can be used to actuate the mirror device, that is to say for example for aligning the mirror device, to a partial portion. In this way, the distance between the actuated mirror device from for example a further mirror device within one and the same interferometer can be changed, as a result of which the interferometer is spectrally tunable.

A voltage used for detecting the deflection of the mirror device can for example be applied to a further partial portion of the first and of the second mirror element. In a further partial portion, a field-free space or a largely field-free space can be obtained, for example for avoiding deformations of the mirror device in the field-free space.

According to a preferred development, the support structure has at least one portion that protrudes from an outer surface of the first and/or of the second mirror element. This portion is thus formed as a stop or as an "anti-static-friction bump" (or "anti-stiction bump" for short). It is particularly advantageous if the at least one support structure has a plurality of such stops or if a plurality of support structures are provided that each have at least one such stop.

Such stops can prevent mirror devices from sticking together or prevent mirror devices from sticking to a substrate, or reduce the likelihood thereof. It is particularly advantageous if at least the respective portion of the at least one support structure acting as a stop is formed from an electrically insulating material (insulator). In this case, it is possible to prevent electrodes from welding together with the mirror elements when using the mirror device for example within an interferometer.

An outer surface of a mirror element is in particular understood to be a surface of the respective mirror element that faces away from the intermediate space between the first and the second mirror element. The outer surface of at least one mirror element also represents the surface onto which light is incident that is to be reflected by the mirror device.

According to a further preferred development, a lateral extent of the at least one support structure overlaps with a lateral extent of the first and/or of the second mirror element. In this way, it is possible to achieve better mechanical coupling between the at least one support structure and the first and/or the second mirror element. A lateral, or transverse, extent is in particular understood to mean an extent in a direction located in a plane that can be thought of as being parallel to the first and the second mirror element. Consequently, the direction is arranged perpendicular to an axial direction, which in turn is arranged perpendicular to the mirror elements.

According to a further preferred development, the at least one support structure is formed from at least two different materials. For example, a first material of the at least one support structure can be in contact with the mirror elements, while a second material of the support structure is formed as a stabilizing core of the support structure and is arranged to increase a stiffness of the support structure and thus to keep a distance between the first and the second mirror element constant for improving the optical properties of the mirror device.

According to a further preferred development, the at least one support structure has a fluid through-channel, through which a fluid can flow through the support structure, the first and the second mirror element. In this way, a thermal and/or atmospheric equilibrium between two different sides of the mirror device can be improved, as a result of which external traction, pressure and deformation forces acting on the mirror device can decrease.

According to a further preferred development, a gas or a vacuum is present in the intermediate space between the first and the second mirror element. Preferably, a material having a low refractive index, which is close to one with particular preference, as is the case for example with air (that is to say a gas or a gas mixture) and in the case of a vacuum, is arranged in the intermediate space. A high refractive index contrast between a refractive index of the intermediate space between the mirror elements and a refractive index of the first and/or of the second mirror element increases the wavelength range in which the mirror device has high reflection and increases the maximum attainable reflection for a constant number of layers in the mirror. A mirror system, in particular an interferometer, having a mirror device that is designed in this way consequently has even more variable possible uses.

According to a preferred development, the mirror system is an interferometer, in particular a Fabry-Perot interferometer, wherein at least one of the mirror devices of the interferometer is a mirror device according to the disclosure.

According to an advantageous development of the method according to the disclosure, removing of in each case a part of the first light-refracting layer, of the sacrificial layer, and of the second light-refracting layer is effected such that the contiguous cutout is produced such that the cutout divides the first and the second light-refracting layer (that is to say the later mirror elements) into at least two partial portions each, which are spaced apart from one another. This has the advantages described above in connection with electrically insulating the partial portions.

According to a preferred development of the method according to the disclosure, the layer stack is provided with a protective layer that is arranged at the second light-refracting layer and that forms the original outer layer of the layer stack at a side of the layer stack. Here, a part of the protective layer is also removed for forming the cutout. The protective layer can act as an etching stop and/or as a polishing stop in the removal of the part of the filling layer, that is to say be more resistant than the filling layer to an etching method used and/or to a polishing device used. The protective layer can be removed once the part of the filling layer has been removed.

BRIEF DESCRIPTION OF THE DRAWINGS

The present disclosure will be explained in more detail below with reference to the exemplary embodiments illustrated in the schematic figures of the drawings, in which.

DETAILED DESCRIPTION

Identical elements and devices, and elements and devices having identical function, are provided—unless specified otherwise—with the same reference signs in all the figures. The numbering of method steps serves for clarity and should in particular not imply any specific time sequence, unless specified otherwise. In particular, a plurality of method steps can also be performed at the same time.

Figure 1:
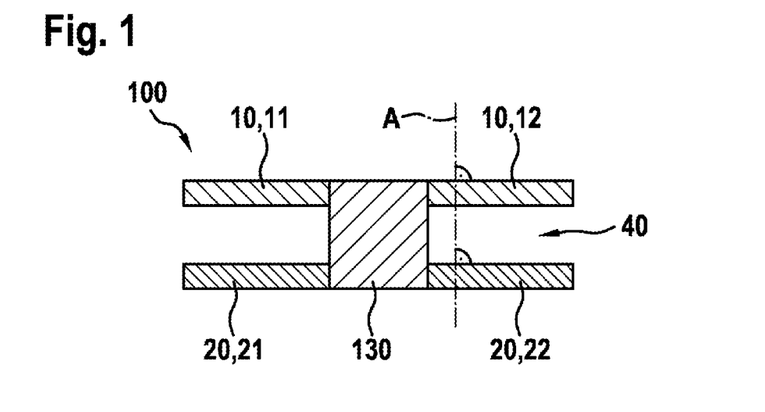
FIG. 1 shows a schematic cross-sectional illustration of a micromechanical mirror device according to an embodiment in a detailed view.

FIG. 1 shows a schematic cross-sectional illustration of a micromechanical mirror device 100 in a detailed view. The mirror device 100 has a first mirror element 10 of planar design and a second mirror element 20 of planar design, which are arranged substantially, or entirely, plane-parallel with respect to one another. An intermediate space 40 between the first and the second mirror element 10, 20 has a lower refractive index than the first mirror element 10 and/or than the second mirror element 20 itself. In this way, the mirror device 100 acts as a micromechanical Bragg mirror.

The mirror device 100 can be designed for example such that the intermediate space 40 is open to the atmosphere and is thus filled with air during operation, with air having a refractive index of close to 1. Alternatively, the mirror device 100 can also be designed such that the intermediate space 40 is closed off in a gas-tight manner. In this case, the intermediate space 40 can be filled with a gas or a gas mixture, for example air. Alternatively, a vacuum may be present in the intermediate space 40, the refractive index of which is likewise close to 1.

The mirror elements 10, 20 have a higher refractive index relative to a refractive index of the intermediate space 40. Advantageously, the first and the second mirror element 10, 20 can both be formed from the same high-refractive material. A high-refractive material is to be understood for example to be a material having a refractive index that is greater than 3. The mirror elements 10, 20 can be formed for example from silicon, having a refractive index of approximately 3.5, or include silicon. However, other materials, such as for example germanium or silicon carbide, are conceivable as materials for the first and/or the second mirror element 10, 20.

The micromechanical mirror device 100 furthermore has a support structure 130, through which the first and the second mirror element 10, 20 are at least locally spaced apart from one another. In other words, the at least one support structure 130 is arranged to ensure a defined and desired distance between the first mirror element 10 and the second mirror element 20 at its position.

The at least one support structure 130 is optionally designed such that the first mirror element 10 is divided into a first partial portion 11 and a second partial portion 12 thereby, and furthermore such that, by the at least one support structure 130, the second mirror element 20 is divided into a first partial portion 21 and a second partial portion 22. The at least one support structure 130 is optionally furthermore designed such that the first and the second partial portion 11, 12 of the first mirror element 10 are electrically insulated from one another and that the first partial portion 21 and the second partial portion 22 of the second mirror element 20 are electrically insulated from one another. For example, the at least one support structure 130 can be formed entirely from an electrically insulating material, such as silicon-rich nitride, silicon carbide (SiC), silicon carbonitride (SiCN) and the like.

The mirror device 100 is described below in accordance with the assumption that the partial portions 11, 12, 21, 22 of the mirror elements 10, 20 are electrically insulated from one another by way of the at least one support structure 130. However, it is to be understood that the at least one support structure 130, or at least one of a plurality of support structures 130, can also be designed to be electrically conductive or semiconductive, with the result that there is no electrical insulation, or only partial electrical insulation, of the partial portions 11, 12, 21, 22.

Partial portions of the mirror elements that are electrically insulated from one another allow for example direct capacitive detection of the distance of the mirror device from a reference object or segmentation of electrodes on the mirror device itself.

Provision may be made here for the first partial portion 11 of the first mirror element 10 and the first partial portion 21 of the second mirror element 20 to be electrically connected to one another, for example at a periphery (not illustrated) of the mirror device 100. In addition or alternatively, provision may be made for the second partial portion 12 of the first mirror element 10 and the second partial portion 22 of the second mirror element 20 to be electrically connected to one another, for example at a periphery (not illustrated) of the mirror device 100.

The at least one support structure 130 overlaps both the first mirror element 10 and the second mirror element 20 in an axial direction A, arranged perpendicular to the first and the mirror element 10, 20. In other words, the at least one support structure 130 passes through both the first mirror element 10 and the second mirror element 20. In yet other words, the at least one support structure extends at least from an outer side of the first mirror element 10 facing away from the second mirror element 20 at least up to an outer side of the second mirror element 20 facing away from the first mirror element 10. The axial direction A is denoted such because it can be used as an optical axis for the mirror device.

The at least one support structure 130 in the mirror device 100 in FIG. 1 is designed to be laterally continuous, that is to say it has in particular no cavities between the first partial portion 11 and the second partial portion 12 of the first mirror element 10 and no cavities between the first partial portion 21 and the second partial portion 22 of the second mirror element 20. Consequently, the support structure 130 has a particularly stiff design, as a result of which deformations of the mirror elements 10, 20 can be prevented or reduced.

Furthermore, the at least one support structure 130 in FIG. 1 is also embodied to be axially continuous. The support structure 130 is formed both at an outer surface of the first mirror element 10 and at an outer surface of the second mirror element 20 in each case flush with the respective mirror element 10, 20, although deviations herefrom are also possible.

Figure 2:
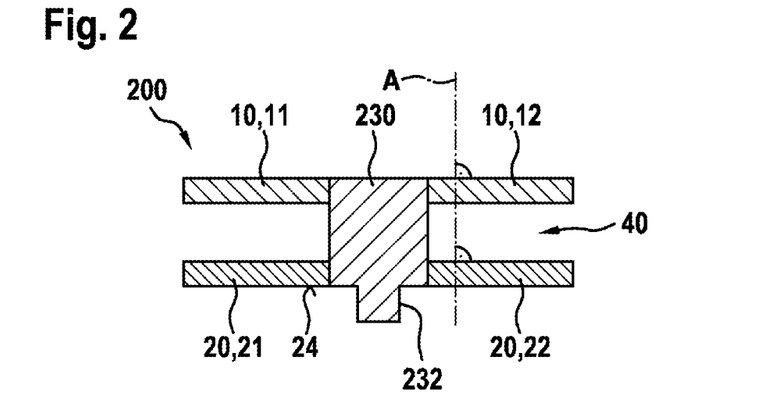
FIG. 2 shows a schematic cross-sectional illustration of a micromechanical mirror device according to a further embodiment in a detailed view.

FIG. 2 shows a schematic cross-sectional illustration of a micromechanical mirror device 200 according to a further embodiment in a detailed view. The mirror device 200 represents a variant of the mirror device 100. The mirror device 200 is likewise designed as described above with respect to the mirror device 100, with the difference that at least one support structure 230 of the mirror device 200 has, on an outer surface 24 of the second mirror element 20, a portion that protrudes from the outer surface 24.

This portion 232 can also be referred to as a stop or as an "anti-stiction bump" (short for "anti-static-friction bump") and has the advantages as described above.

Figure 3:
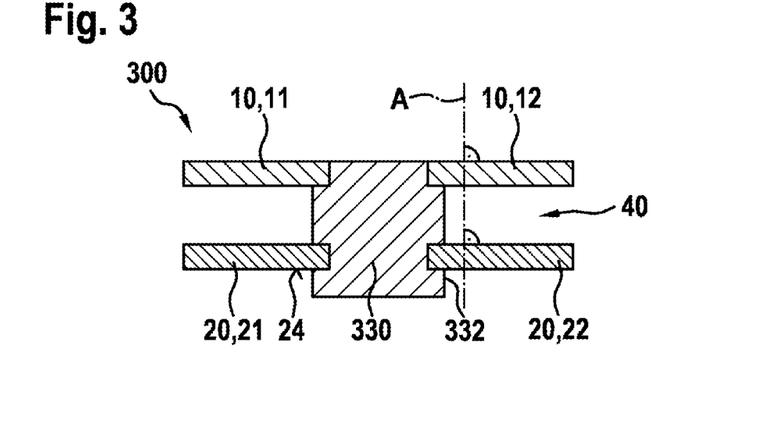
FIG. 3 shows a schematic cross-sectional illustration of a micromechanical mirror device according to yet a further embodiment in a detailed view.

FIG. 3 shows a schematic cross-sectional illustration of a micromechanical mirror device 300 according to yet a further embodiment in a detailed view. The mirror device 300 is also a variant of the mirror device 100. The mirror device 300 differs from the mirror device 100 again in terms of the design of an at least one support structure 330 of the mirror device 300 rather than the at least one support structure 130 of the mirror device 100.

The at least one support structure 330 is embodied such that it overlaps both the first mirror element 10 and the second mirror element 20 laterally or transversely to ensure better mechanical coupling. Independently thereof, and optionally, the at least one support structure 330 is additionally designed such that it has a portion 332 which protrudes from the second outer surface 24 of the second mirror element 20 and thus not only engages particularly well around the second mirror element 20 but at the same time provides with the portion 332 in turn a stop or an anti-stiction bump.

Figure 4:
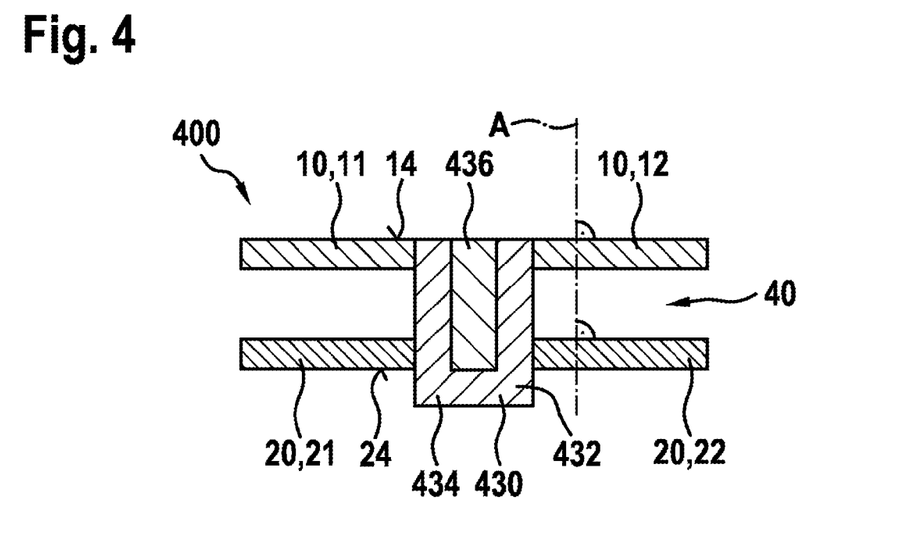
FIG. 4 shows a schematic cross-sectional illustration of a micromechanical mirror device according to yet a further embodiment in a detailed view.

FIG. 4 shows a schematic cross-sectional illustration of a micromechanical mirror device 400 according to yet a further embodiment in a detailed view. The mirror device 400 is also a variant of the mirror device 100 and differs from the mirror device 100 in terms of the design of a support structure 430, which in the mirror device 400 takes the place of the support structure 130 of the mirror device 100.

The support structure 430 is formed from two different materials, wherein at least one of the two materials is an electrically insulating material. The electrically insulating material 434 is in direct contact with the first and the second mirror element 10, 20, while the second material is in direct contact only with the first material 434 and is surrounded entirely by the first material 434 except on an outer surface 14 of the first mirror element 10. The second material 436 can thus be referred to as a core of the support structure 430 and can have, for example, a stiffer design than the first material 434 so as to give the support structure 430 greater stiffness overall.

The second material 436 can be designed to be electrically insulating, but does not have to be designed to be electrically insulating. As a result, the electrical properties of the support structure 430, which are due to the first material 434, and the mechanically stabilizing properties of the support structure 430, which are due to the combination of the first material 434 with the second material 436, are largely able to be optimized separately from one another.

A portion 432 that protrudes from the outer surface 24 of the second mirror element 20 and can be utilized for example as a type of stop or anti-stiction bump can also be provided in the case of the at least one support structure 430.

Figure 5:
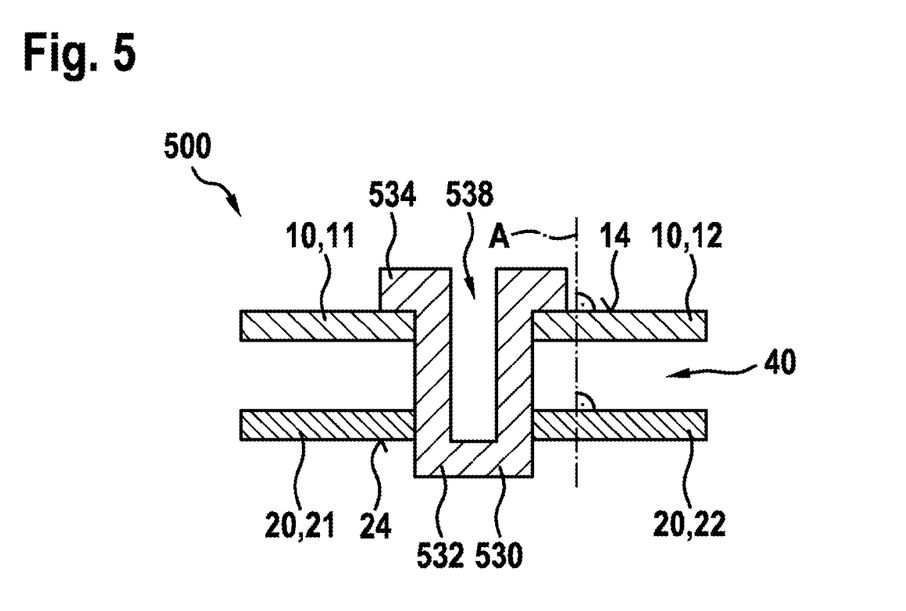
FIG. 5 shows a schematic cross-sectional illustration of a micromechanical mirror device according to yet a further embodiment in a detailed view.

FIG. 5 shows a schematic cross-sectional illustration of a micromechanical mirror device 500 according to yet a further embodiment in a detailed view. The mirror device 500 is able to be referred to as a variant of the mirror device 100, wherein the mirror device 500 differs from the mirror device 100 by way of a support structure 530, which is used instead of the support structure 130.

The at least one support structure 530 has a blind hole or cutout 538, which opens to an outer side of the mirror device 500, for example on the outer surface 14 of the first mirror element 10. The at least one support structure 530 advantageously has at the outer surface 14 of the first mirror element 10 a portion 534 that protrudes above the outer surface 14 of the mirror element 10 and overlaps the first and the second mirror element 10, 20 in a lateral direction. In this way, the mechanical coupling of the at least one support structure 530 to the first and the second mirror element 10, 20 can be further improved. Furthermore, the at least one support structure 530 can also have a portion 532 that protrudes from the outer surface 24 of the second mirror element 20.

The support structure 530 can furthermore be designed such that it overlaps both the first mirror element 10 and the second mirror element 20 laterally or transversely to ensure better mechanical coupling.

Figure 6:
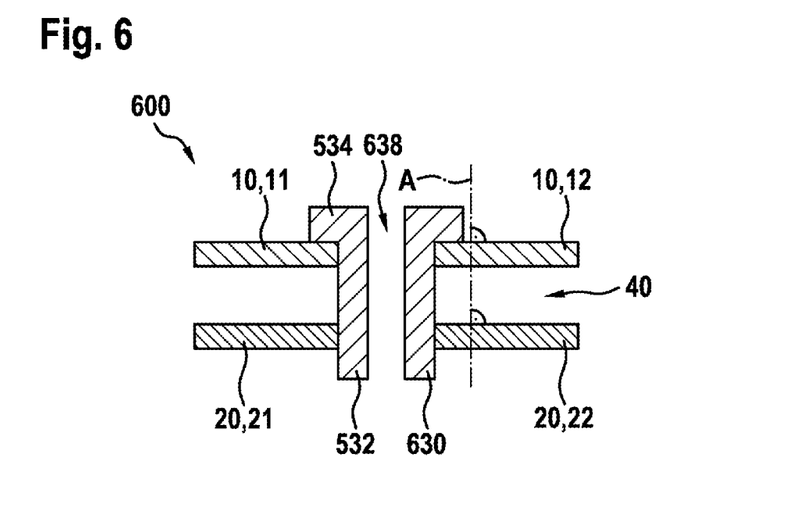
FIG. 6 shows a schematic cross-sectional illustration of a micromechanical mirror device according to yet a further embodiment in a detailed view.

FIG. 6 shows a schematic cross-sectional view of a micromechanical mirror device 600 according to yet a further embodiment. The mirror device 600 is a variant of the mirror device 500 and differs therefrom in that a support structure 630 takes the place of the support structure 530 of the mirror device 500. The at least one support structure 630 is designed like the at least one support structure 530 of the mirror device 500 except for the difference that the at least one support structure 630 has no blind hole 538, but instead has a fluid through-channel 638, which passes through the entire support structure 630.

The at least one support structure 630 can be designed such that it has at least one locally delimited fluid through-channel 638. Alternatively, the at least one support structure 630 can also be designed such that the fluid through-channel 638 extends along the entire support structure 630.

Various elements of the mirror devices 100-600 described above can of course be combined with one another. For example, the mirror devices 100, 200, 300 and 400 can also have a portion 534 that protrudes from the outer surface 14 of the first mirror element 10 to promote better mechanical coupling. Furthermore, the support structures 130, 230, 330, 430 of the mirror devices 100 to 400 can also have a blind hole 538 or a fluid through-channel 638, as shown in FIGS. 5 and 6 and as was described in the corresponding text passages.

In addition, the support structures 130, 230, 330, 530 and 630 can be formed from more than two materials, as is illustrated in FIG. 4 and as was explained above with respect to FIG. 4.

It is to be understood that lateral overlap of the support structures 130, 230, 430, 530, 630 with the first and/or the second mirror element 10, 20, in particular in the region of the intermediate space 40, can be provided, as is shown in FIG. 3 and was described above with respect to FIG. 3.

Figure 7:
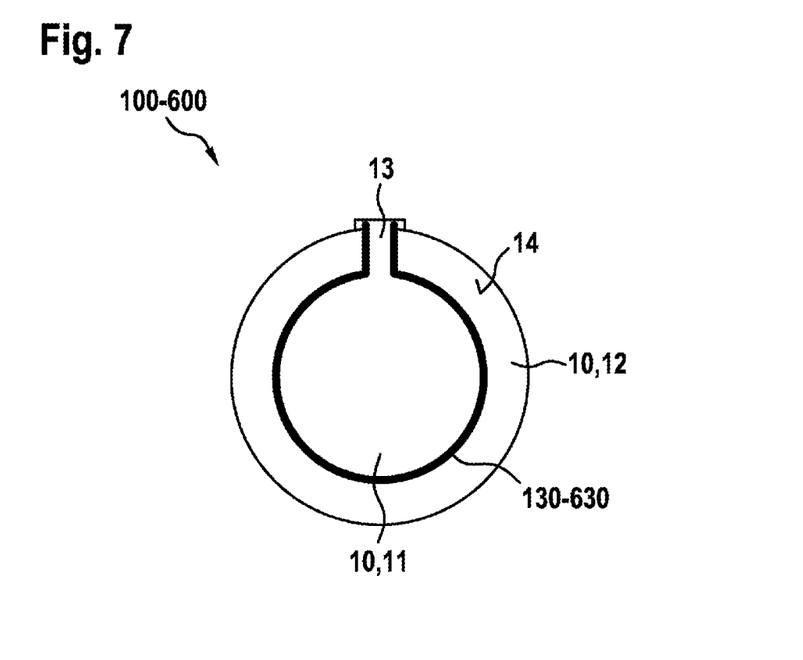
FIG. 7 shows a schematic plan view of a section of a micromechanical mirror device according to one of FIGS. 1 to 6.

FIG. 7 shows a schematic plan view of a section of a possible advantageous embodiment of the micromechanical mirror device 100-600 onto the outer surface 14 of the first mirror element 10. FIG. 7 illustrates that the first partial portion 11 of the first mirror element 10, the support structure 130 to 630, and the second partial portion 12 of the first mirror element 10 (and, accordingly, the partial portions 21, 22 of the second mirror element 20, which cannot be seen in FIG. 7) are designed such that the first partial portion 11 is surrounded in lateral directions almost completely by the second partial portion 12, wherein a cross piece 13 of the first mirror element 10 is electrically connected to the first partial portion 11 and is electrically insulated from the second partial portion 12, with the result that both the first partial portion 11 and the second partial portion 12 can be electrically contacted advantageously at a periphery of the mirror device 100-600.

The at least one support structure 130 to 630 in the first mirror element 10 in plan view has preferably substantially (in particular except for the cross piece 13) a circular shape, such that the first partial portion 11 within the second partial portion 12 is designed to be substantially circular. In this way, a particularly homogeneous electrical field can be present or formed in the region of the first partial portion 11, as a result of which undesirable electrical effects, such as during actuation and/or detection, can be reduced or avoided.

If a mirror system (see also FIG. 8) has for example two of the mirror devices 100-600 according to the disclosure, the two mirror devices can be actuated bidirectionally and move toward one another owing to the ring-shaped electrodes, as shown in FIG. 7. This is because, in the case of two-dimensional electrodes, an attraction between the two mirror devices would otherwise prevail which acts like a two-dimensional pressure load and could thus result in sagging of the mirror devices and in a decrease in the parallelism. This could increase the spectral pass width of the mirror device and thus reduces the resolution of an interferometer formed by the two mirror devices 100-600.

The situation is similar for capacitive detection if a voltage is applied between two mirror devices of an interferometer. This is because in this case attraction occurs in the case of two-dimensional electrodes and, as described above, the parallelism of the interferometer mirrors in the optically relevant region, which in FIG. 7 corresponds to the first partial portion 11, is decreased. The embodiments described herein thus permit capacitive detection, in particular direct measurement of an optical gap between two mirror devices of an interferometer, without this resulting in decreases in mirror parallelism between the mirror devices of the interferometer.

Further segmentation is of course also conceivable, for example a segmentation into more than two partial portions 11, 12 that are substantially concentric with respect to one another. This can be used for example to produce a completely or largely field-free space in the optically relevant innermost partial portion 11. This can be achieved for example by a first electric potential being applied in a central partial portion 12, which largely encloses the innermost partial portion 11, as shown in FIG. 7, and a second electric potential being applied to a third partial portion, which substantially circularly encloses both the first partial portion 11 and the second partial portion 12 (not illustrated in FIG. 7), said second electric potential having an opposite sign as compared to the first electric potential.

Provision may be made for the mirror device 100-600 according to the disclosure additionally or alternatively to the at least one electrically insulating support structure 130-630 to also have at least one further support structure that does not effect electrical insulation of partial portions of mirror elements 10, 20. This can be achieved for example by way of said additional support structures not completely separating any partial portions from one another and/or by the support structures themselves being designed as being electrically conductive or semiconductive, in particular from the same material as the first and/or the second mirror element 10, 20.

Said further support structures, which do not effect any electrical insulation of partial portions, can also be referred to as auxiliary support structures. The auxiliary support structures can be arranged for example in the form of regular or irregular grids. For example, an auxiliary support structure can be designed in the form of a hexagonal honeycomb pattern, which preferably extends completely over one of the partial portions of the mirror elements 10, 20. For example, in the embodiment shown in FIG. 7, a first such auxiliary support structure can be arranged extensively at the first partial portion 11, and/or a second auxiliary support structure can be arranged extensively at the second partial portion 12 of the first mirror element 10 and the second partial portion 22 of the second mirror element 20.

A great advantage of the support structures and auxiliary support structures described herein is the mechanical stiffness with respect to a tension-induced deformation. Supporting structures ("anchor structures") known to date often have the intrinsic disadvantage that a tensile prestress of the mirror devices results in the anchor structures deforming in order to partially decrease the prestress. Said deformation in a region around a respective anchor structure has the result that the spacing-apart of the partial layers (according to the mirror elements) no longer corresponds to that of the wavelength to which the Bragg mirror is set, as a result of which the optical properties of the Bragg mirror, that is to say of the mirror device, deteriorate. By contrast, the support structures and auxiliary support structures described herein have the clear advantage that they have a greater stiffness with respect to such deformations, as a result of which a loss of optical area due to incorrectly spaced-apart mirror elements 10, 20 is minimized.

The auxiliary support structures can be realized as at least partially or completely continuous wall structures and/or as column structures that are separate and spaced apart from one another. Hexagonal grid arrangements offer a particularly high mechanical stability. The support structures and/or the auxiliary support structures can here be embodied as filled or as hollow/folded-in structures. The support structures and/or the auxiliary support structures can also be designed such that a layer stress is adapted to a membrane.

Figure 8:
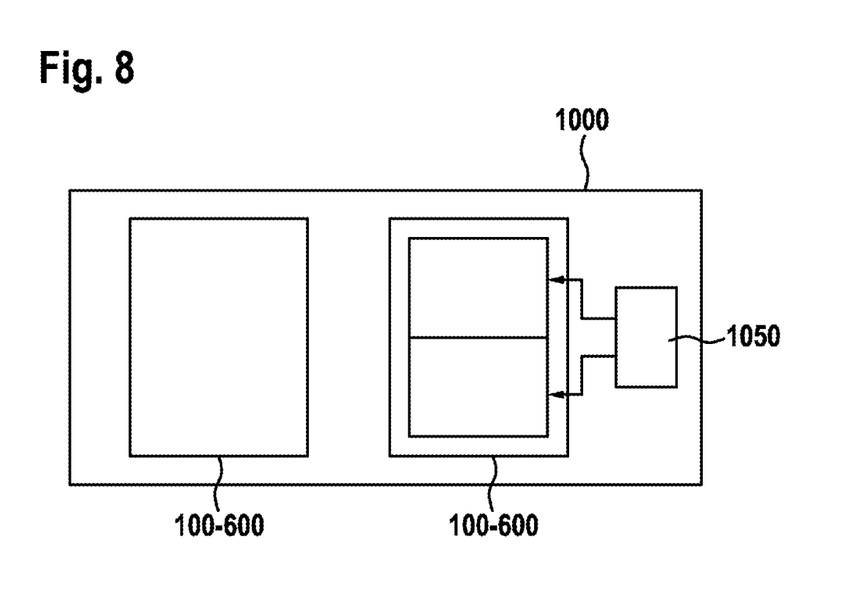
FIG. 8 shows a schematic block diagram for explaining a mirror system according to a further embodiment.

FIG. 8 shows a schematic block diagram for explaining a mirror system 1000 in accordance with a further embodiment. The mirror system 1000 can be, for example, an interferometer, in particular a Fabry-Perot interferometer. The mirror system 1000 is designed with at least two dielectric or semi-conducting mirror devices, of which at least one is a mirror device 100-600 according to the disclosure.

At least one of the mirror devices, in particular a mirror device 100-600 according to the disclosure, is movable relative to the at least one other mirror device.

FIG. 8 does not imply a geometric arrangement of the mirror devices. The mirror devices are preferably arranged at, or on, a common substrate and are substantially (or entirely) aligned parallel to one another to form a Fabry-Perot interferometer, as is already known in the prior art.

By changing the distance between the two mirror devices (in particular by moving the movable mirror device), the mirror system 1000 can be operated for example as a tunable spectral filter. To change the distance between the mirror devices, at the at least one mirror device 100-600 according to the disclosure a first electric potential can be applied to a first partial portion 11 of said mirror device 100-600 by way of a contacting device 1050 of the mirror system 1000, and a second electric potential can be applied to a second partial portion of said mirror device 100-600, for example as described in more detail above with respect to FIG. 7.

The contacting device 1050 can also be designed to apply at least one electric potential to the at least one further mirror device of the mirror system 1000. Preferably, all mirror devices in the mirror system 1000 are mirror devices 100-600 according to the disclosure, and the contacting device 1050 is designed to apply different electric potentials to the different partial portions 11, 12, 21, 22 of the at least two mirror devices 100-600 of the mirror system 1000.

Figure 9:
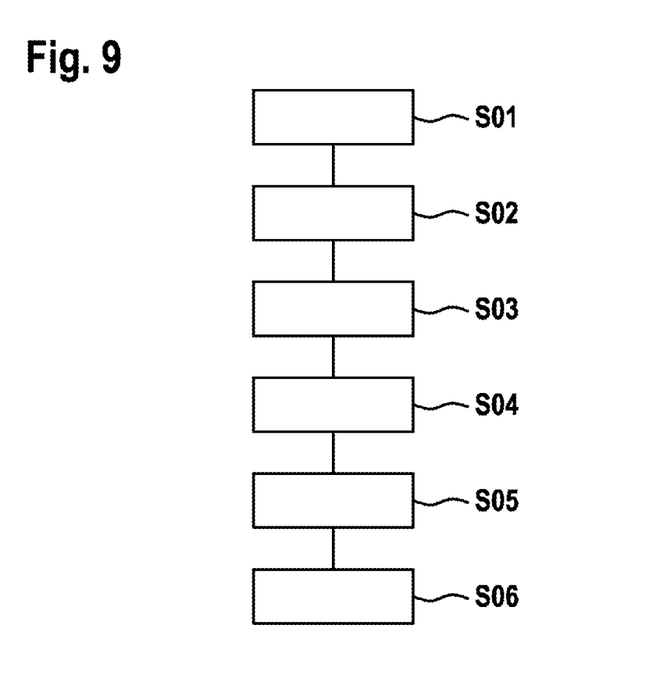
FIG. 9 shows a schematic flow chart for explaining a method for producing a micromechanical mirror device.

FIG. 9 shows a schematic flow chart for explaining a method for producing a micromechanical mirror device, in particular a micromechanical mirror device 100-600 according to the disclosure. The method according to FIG. 9 is explained in more detail below with reference to FIGS. 10 to 15 and with reference to the reference signs in those figures. The method according to FIG. 9 is adaptable in accordance with all the variants and developments described with respect to the mirror device 100-600 according to the disclosure, and vice versa.

FIGS. 10 to 15 show schematic detailed views in cross section through intermediate products of the method according to the disclosure for producing the micromechanical mirror device.

Figure 10:
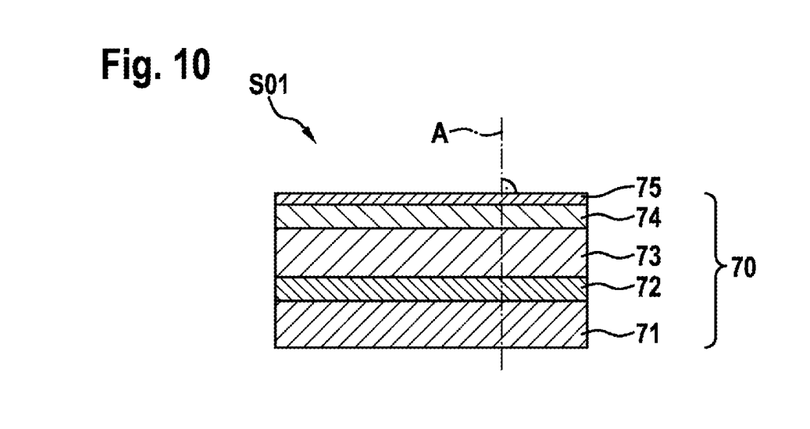
FIGS. 10 to 15 show schematic detailed views in cross section of intermediate products of the method according to the disclosure for producing the micromechanical mirror device.

In a step S01, a layer stack 70 is provided, having: a dielectric layer 71, a first light-refracting layer 72 arranged at the dielectric layer 71, a sacrificial layer 73 arranged at the first light-refracting layer 72, a second light-refracting layer 74 arranged at the sacrificial layer 73. Optionally, the layer stack 70a can also be provided with a protective layer 75 that is arranged at the second light-refracting layer 74. The dielectric layer 71 can likewise serve as a sacrificial layer, depending on the design.

In other words, the layer stack 70 comprises, arranged adjacent to one another in the following sequence, the first dielectric layer 71, the first light-refracting layer 72, the sacrificial layer 73, the second light-refracting layer 74, and, optionally, the protective layer 75. The light-refracting layers 72, 74 are in particular highly refractive layers, that is to say layers having a higher refractive index than air.

The dielectric layer 71 and/or the sacrificial layer 73 are layers which are simply removable in the further progression of the method and can consist, for example, of silicon dioxide, $SiO_2$. The first and/or the second light-refracting layer 72, 74, from which the mirror elements will be produced below, consist for example of a material such as silicon, in particular polysilicon, wherein other materials such as germanium or silicon carbide, which are compatible with the sacrificial layer etching process in which the sacrificial layer 73 and possibly also the dielectric layer 71 will be removed at a later point, are also conceivable.

The optional protective layer 75 can be advantageous in the further processing and consist for example of silicon dioxide ($SiO_2$).

FIG. 10 shows an intermediate product of the method after the method step S01 has been performed.

The text below will explain with reference to FIGS. 11 to 15 how a single support structure 130-630 (always in cross-sectional illustration) can be produced, with it being understood that, in plan view, the at least one support structure 130-630 can be embodied for example as shown in FIG. 7 and/or as was explained in more detail with respect to FIG. 7. It is furthermore to be understood that a multiplicity of support structures 130-630 can be formed at the same time in the same way, for example for simultaneously forming a multiplicity of partial portions 11, 12, 21, 22 that are electrically insulated from one another.

Figure 11:
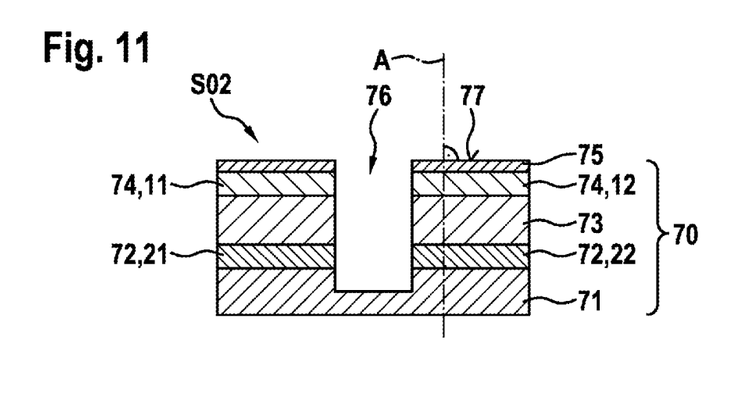

In a step S02, in each case a part of the first light-refracting layer 72, of the sacrificial layer 73, and of the second light-refracting layer 74 is removed such that a contiguous cutout 76 is formed such that the cutout 76 divides the first and the second light-refracting layer 72, 74 in each case into at least two partial portions 11, 12, 21, 22 which are spaced apart from one another.

The layers 72-74 are removed such that the cutout 76 overlaps the first and the second light-refracting layer 72, 74 in an axial direction A, arranged perpendicular to the first and the second light-refracting layer 72, 74, as was likewise explained in FIG. 1 with respect to the support structure 130.

The cutout 76 can be formed for example by lithography and/or etching. The cutout can be embodied in particular, in plan view, as a round hole or as a trench.

The dielectric layer 71 and the sacrificial layer 73, and optionally also the optional protective layer 75, can be etched isotropically or partially isotropically so as to permit, after a conform deposition of a filling layer for forming the later support structure, better mechanical coupling of the later support structure to the first and the second light-refracting layer 72, 74 (later mirror elements) through a relatively large contact area. A possible end result is illustrated for example in FIG. 3 and was explained in more detail with respect to FIG. 3.

After, or during, the fundamental formation S02 of the cutout 76, for example in a further method step, the dielectric layer 71 can be optionally etched out from the cutout 76, so that the later support structure is embodied with stops, for example a stop 232 as shown in FIG. 2 and described with respect to FIG. 2.

If in step S01 a layer stack 70 with a protective layer 75 is provided, the collective cutout is accordingly also formed through the protective layer 75. An intermediate product of the method after the performance of step S02 is illustrated in FIG. 11. It can be seen here that the cutout 76 is illustrated in cross section as a blind hole.

For electrically separating mutually spaced-apart partial portions 11, 12, 21, 22 of the mirror elements 10, 20, the cutout 76, which partially prescribes the shape of the later support structure, can be formed as an elongated structure, for example an elongated channel.

The cutout 76 will preferably be shaped, in plan view, such as was described with respect to FIG. 7 with respect to the at least one support structure 130 to 630 between the first partial portion 11 and the second partial portion 12.

Alternatively, the cutout 76, or a plurality of cutouts 76, can also be embodied in a manner of columns or in any other shape.

Figure 12:
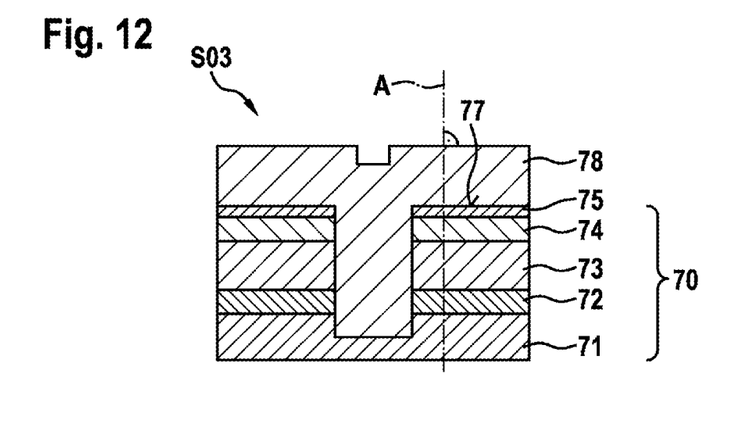

In a step S03, a filling layer 78 is deposited, for example using a gas phase deposition process or other known processes for depositing layers on substrates, on a side of the layer stack 70 to which the cutout 76 opens and which is denoted in FIG. 11 with 77. Owing to the existing cutout 76, the filling layer 78 will not merely arrange flatly on the layer stack 70, but will entirely or partially fill the cutout 76, as is shown in FIG. 12. FIG. 12 schematically illustrates an intermediate product of the method according to the disclosure after the method step S03. The filling layer 78 consists of a material or has a material that differs from the material (or the materials) of the light-refracting layers 72, 74.

It was explained in detail above that it is advantageous if the at least one support structure electrically insulates different partial portions 11, 12, 21, 22 of the mirror elements from one another. For this purpose, the filling layer 78 can be designed as an electrically insulating layer 78, i.e. can consist of an electrically insulating material or material mixture.

During the deposition S03 of the filling layer 78, deposition that this is conform as possible is preferred. The deposited layer thickness of the filling layer is here preferably at least half the width of the cutout 76 so as to produce as little topography as possible, that is to say to effect filling of the cutout 76 that is as homogeneous as possible. The filling layer 78 advantageously consists of a silicon-based or aluminum-based insulator, for example silicon nitride, silicon carbide, silicon carbonitride, or aluminum oxide.

In a step S04, at least the part of the additional layer 78 that is located outside an original outer surface of the layer stack is removed. In particular, material can be removed over the entire area. If in step S01 a layer stack 70 is provided with the optional protective layer 75, the part of the filling layer 78 that protrudes over the protective layer 75 is removed, as illustrated in FIG. 13.

Removing S04 the protruding part of the filling layer 78 is preferably effected by etching and/or polishing. The protective layer 75, if it has been formed, can here act as an etching stop or polishing stop. The formation of the protective layer 75 can be dispensed with in particular if the selected processes have sufficient selectivity, that is to say have a sufficiently good effect on the filling layer 78 and at the same time do not attack the second light-refracting layer 74, or only to a slight extent.

Figure 13:
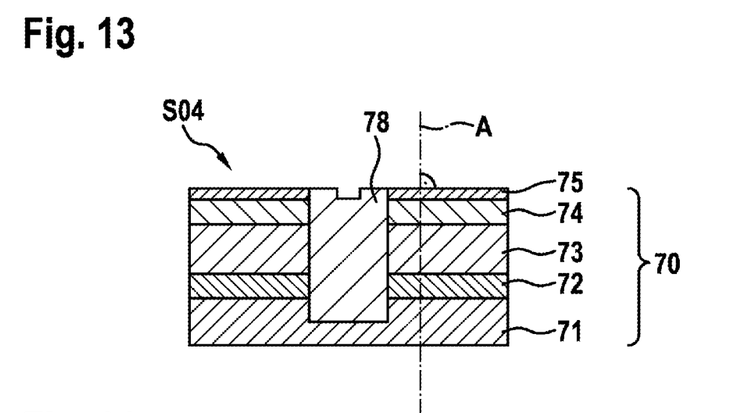

FIG. 13 shows a schematic detailed view in cross-sectional illustration of an intermediate product of the method according to the disclosure for producing the micromechanical mirror device after performing step S04.

If no optional protective layer 75 has been provided, and if the original outer surface of the layer stack 70 is provided for example by the second light-refracting layer 74, the part of the filling layer 78 that is located outside said original outer surface, that is to say the second light-refracting layer 74, that is to say protrudes therefrom, is removed correspondingly.

Figure 14:
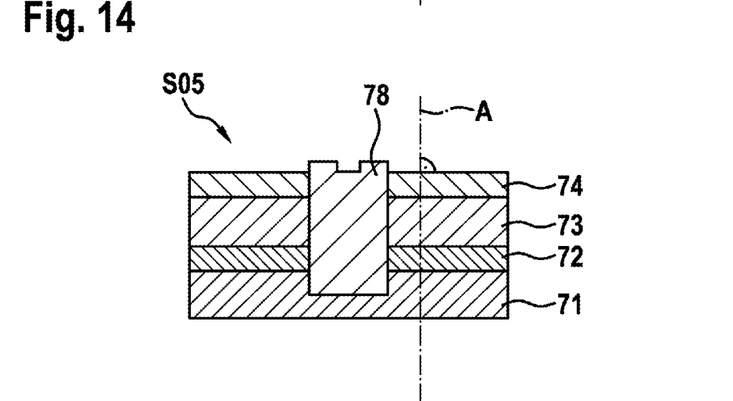

In an optional step S05, the protective layer 75 is removed after the method step S04.

FIG. 13 shows, in a schematic cross-sectional illustration, an intermediate product of the method for producing the micromechanical mirror device after the optional step S05 has been performed.

Figure 15:
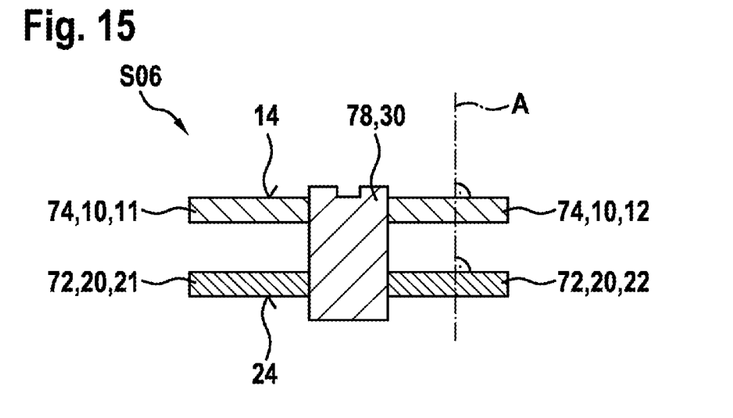

In a step S06, finally, the dielectric layer and/or the sacrificial layer 73 is/are removed by way of a sacrificial layer etching process via sacrificial layer etching access points (not illustrated here). In this way, the light-refracting layers 72, 74 are provided as mirror elements 10, 20 with mutually spaced-apart partial portions 11, 12, 21, 22 (which are optionally electrically insulated from one another). In some embodiments, the light-refracting layers 72, 74 can be exposed as mirror elements 10, 20 with mutually spaced-apart partial portions 11, 12, 21, 22 (which are optionally electrically insulated from one another).

The remaining filling layer 78 thus acts as support structure 30, as illustrated in FIG. 15.

For producing the mirror device 100 according to FIG. 1, portions of the filling layer 78 that protrude for example over the respective outer surfaces 14, 24 of the first and second mirror elements 10, 20 can be removed.

Although the present disclosure has been described above with reference to preferred exemplary embodiments, it is not limited thereto, but is modifiable in various ways. In particular, the disclosure can be changed or modified in various ways without departing from the core of the disclosure.

The invention claimed is:

1. A micromechanical mirror device, comprising:
a first mirror element configured to be planar;
a second mirror element configured to be planar, the first and second mirror elements substantially arranged in a plane-parallel manner; and
an intermediate space between the first and second mirror elements having a lower refractive index than one or more of the first mirror element and the second mirror element;
wherein the first and second mirror elements are locally arranged to be spaced apart from one another by at least one support structure, the at least one support structure overlapping the first and second mirror elements in an axial direction that is arranged perpendicular to the first and second mirror elements;
wherein the at least one support structure includes a material, or is formed from a material, that differs from a material from which the one or more of the first mirror element and the second mirror element is formed; and wherein the at least one support structure has a fluid through-opening through which a fluid is configured to flow through the support structure, the first mirror element, and the second mirror element.

2. The mirror device as claimed in claim 1, wherein the material of the at least one support structure has one or more of a different thickness and a different mechanical stress than the material of the one or more of the first mirror element and the second mirror element.

3. The mirror device as claimed in claim 1, wherein the at least one support structure divides the first mirror element and the second mirror element into at least two partial portions each, which are electrically insulated from one another by the at least one support structure.

4. The mirror device as claimed in claim 1, wherein the at least one support structure has at least one portion that protrudes from an outer surface of at least one of the first mirror element and the second mirror element.

5. The mirror device as claimed in claim 1, wherein a lateral extent of the at least one support structure overlaps with a lateral extent of the one or more of the first mirror element and the second mirror element.

6. The mirror device as claimed in claim 1, wherein the at least one support structure is formed from at least two different materials.

7. The mirror device as claimed in claim 4, wherein the at least one portion of the at least one support structure functions as a stop or as an anti-stiction elevation and is formed of an electrically insulating material.

8. The mirror device as claimed in claim 1, wherein a gas or a vacuum is present in the intermediate space between the first and second mirror elements.

9. A mirror system, comprising:
a mirror device, including:
  a first mirror element configured to be planar,
  a second mirror element configured to be planar, the first and second mirror elements substantially arranged in a plane-parallel manner, and
  an intermediate space between the first and second mirror elements having a lower refractive index than one or more of the first mirror element and the second mirror element,
  wherein the first and second mirror elements are locally arranged to be spaced apart from one another by at least one support structure, the at least one support structure overlapping the first and second mirror elements in an axial direction that is arranged perpendicular to the first and second mirror elements, and
  wherein the at least one support structure includes a material, or is formed from a material, that differs from a material from which the one or more of the first mirror element and the second mirror element is formed;
  wherein the at least one support structure has a fluid through-opening through which a fluid is configured to flow through the support structure, the first mirror element, and the second mirror element; and
a contacting device configured to apply different electric potentials to at least two partial portions, which are electrically insulated from one another, of the one or more of the first mirror element and the second mirror element.

10. A method for producing a micromechanical mirror device from a layer stack having a dielectric layer, a first light-refracting layer arranged at the dielectric layer, a sacrificial layer arranged at the first light-refracting layer, and a second light-refracting layer arranged at the sacrificial layer, the method comprising:
  removing in each case a part of the first light-refracting layer, of the sacrificial layer, and of the second light-refracting layer to produce a contiguous cutout in the layer stack such that the cutout overlaps the first and second light-refracting layers in an axial direction arranged perpendicular to the first and second light-refracting layers;
  depositing a filling layer on a side of the layer stack to which the cutout opens, the filling layer consisting of a material that differs from a material of one or more of the first light-refracting layer and the second light-refracting layer;
  removing a part of the filling layer that lies outside an original outer layer of the layer stack; and
  removing the sacrificial layer for providing the first and second light-refracting layers as mirror elements that are plane-parallel with respect to one another,
  wherein the filling layer has a fluid through-opening through which a fluid is configured to flow through the filling layer, the first light-refracting element, and the second light-refracting element.

11. The method as claimed in claim 10, wherein the removing of the respective parts of the first light-refracting layer, the sacrificial layer, and the second light-refracting layer is effected such that the contiguous cutout is produced such that the cutout divides the first and second light-refracting layers into at least two partial portions each, which are spaced apart from one another.

12. The method as claimed in claim 10, wherein the layer stack is provided with a protective layer that is arranged at the second light-refracting layer and forms the original outer layer of the layer stack on a side of the layer stack, wherein a part of the protective layer is also removed for forming the cutout, and wherein the protective layer acts as one or more of an etching stop and a polishing stop during the removal of the part of the filling layer, the method further comprising:
  removing the protective layer after the part of the filling layer has been removed.

13. The method as claimed in claim 10, wherein the depositing of the filling layer includes depositing the filling layer in such a way that the filling layer has at least one portion that protrudes from an outer surface of at least one of the first light-refracting layer and the second light-refracting layer, the outer surface facing away from the sacrificial layer.

14. The method as claimed in claim 13, wherein the at least one portion of the filling layer functions as a stop or as an anti-stiction elevation and is formed of an electrically insulating material.

* * * * *